(12) United States Patent
Yamashita

(10) Patent No.: US 11,836,048 B2
(45) Date of Patent: Dec. 5, 2023

(54) INFORMATION PROCESSING APPARATUS

(71) Applicant: CANON KABUSHIKI KAISHA, Tokyo (JP)

(72) Inventor: Takahiro Yamashita, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/670,056

(22) Filed: Feb. 11, 2022

(65) Prior Publication Data

US 2022/0261316 A1 Aug. 18, 2022

(30) Foreign Application Priority Data

Feb. 18, 2021 (JP) .................................. 2021-024692

(51) Int. Cl.
*G06F 11/07* (2006.01)
*G06F 11/14* (2006.01)

(52) U.S. Cl.
CPC .... *G06F 11/1458* (2013.01); *G06F 2201/865* (2013.01)

(58) Field of Classification Search
CPC .................................................. G06F 11/1458
USPC ................................................ 714/6.3; 713/2
See application file for complete search history.

(56) References Cited

U.S. PATENT DOCUMENTS

| 7,100,087 B2* | 8/2006 | Yang ..................... G06F 9/4401 714/36 |
| 7,334,121 B2* | 2/2008 | Lee ..................... G06F 11/1417 714/48 |
| 7,711,989 B2* | 5/2010 | Wang .................. G06F 11/0781 714/36 |
| 11,340,990 B2* | 5/2022 | Hsu ..................... G06F 11/1469 |
| 2003/0126511 A1* | 7/2003 | Yang ..................... G06F 9/4401 714/39 |
| 2009/0254898 A1* | 10/2009 | Sareen ................ G06F 11/1433 713/1 |
| 2014/0281451 A1* | 9/2014 | Friedman ............ G06F 11/1451 713/2 |
| 2015/0149815 A1* | 5/2015 | Maity ................. G06F 11/1417 714/5.11 |
| 2017/0185429 A1* | 6/2017 | Jeansonne ............. H04L 9/3242 |
| 2018/0039553 A1* | 2/2018 | Kitagawa ................ G06F 11/00 |

FOREIGN PATENT DOCUMENTS

| CN | 107766102 A | * | 3/2018 | ............ G06F 9/4411 |
| JP | 2020095470 A | | 6/2020 | |

* cited by examiner

*Primary Examiner* — Chae M Ko
(74) *Attorney, Agent, or Firm* — Canon U.S.A., Inc. IP Division

(57) ABSTRACT

According to an aspects of the present disclosure, an information processing apparatus includes a storage unit configured to store at least one program and at least one processor that reads the at least one program from the storage unit and verifies validity of the read at least one program, wherein the processor executes the at least one program based on a determination that the at least one program is valid, the processor verifies validity of a backup corresponding to the at least one program based on a determination that the at least one program is invalid, and the processor overwrites the at least one program that is stored in the storage unit with the backup corresponding to the at least one program based on a determination that the at least one program is invalid and the backup corresponding to the at least one program is valid.

10 Claims, 5 Drawing Sheets

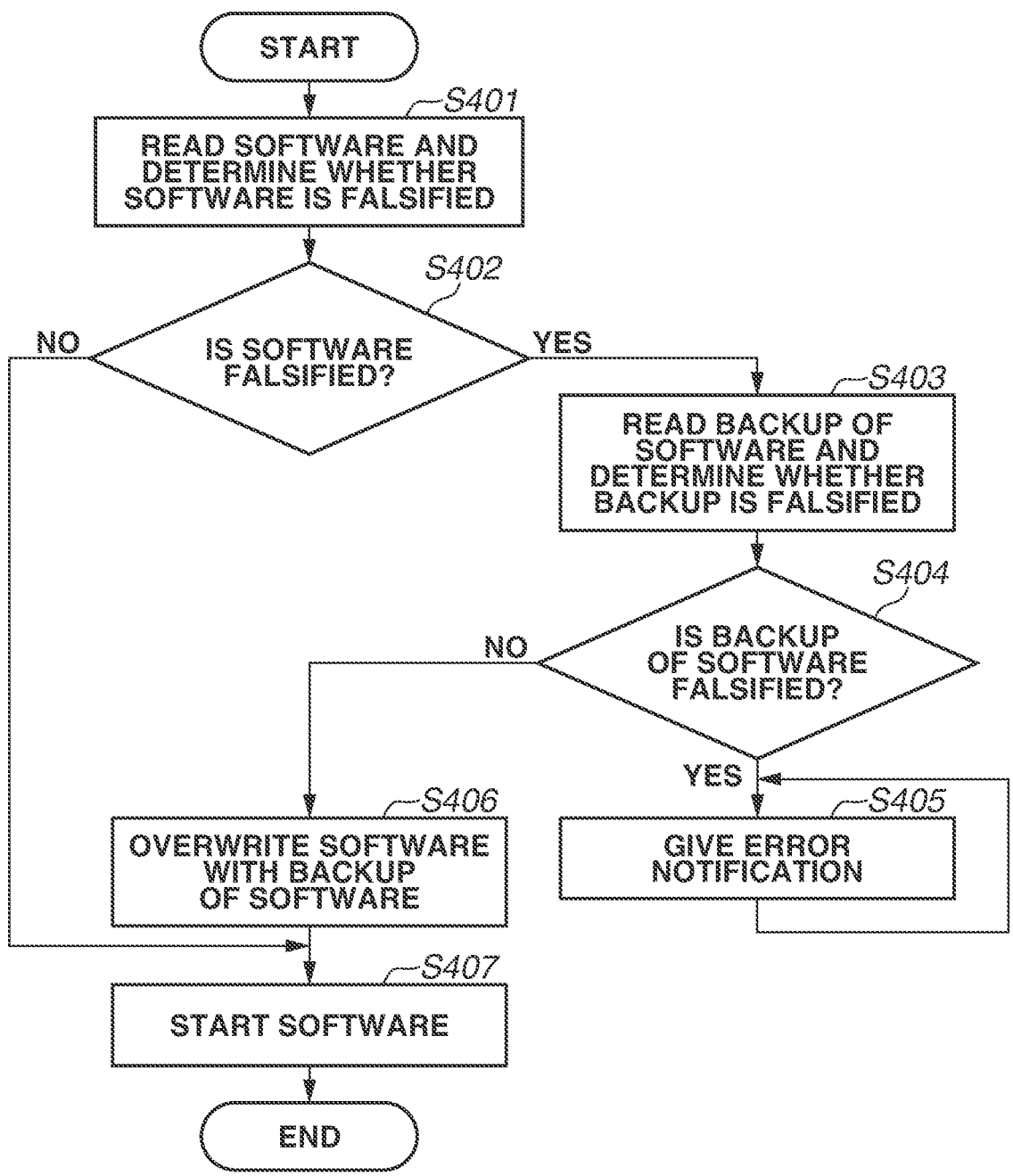

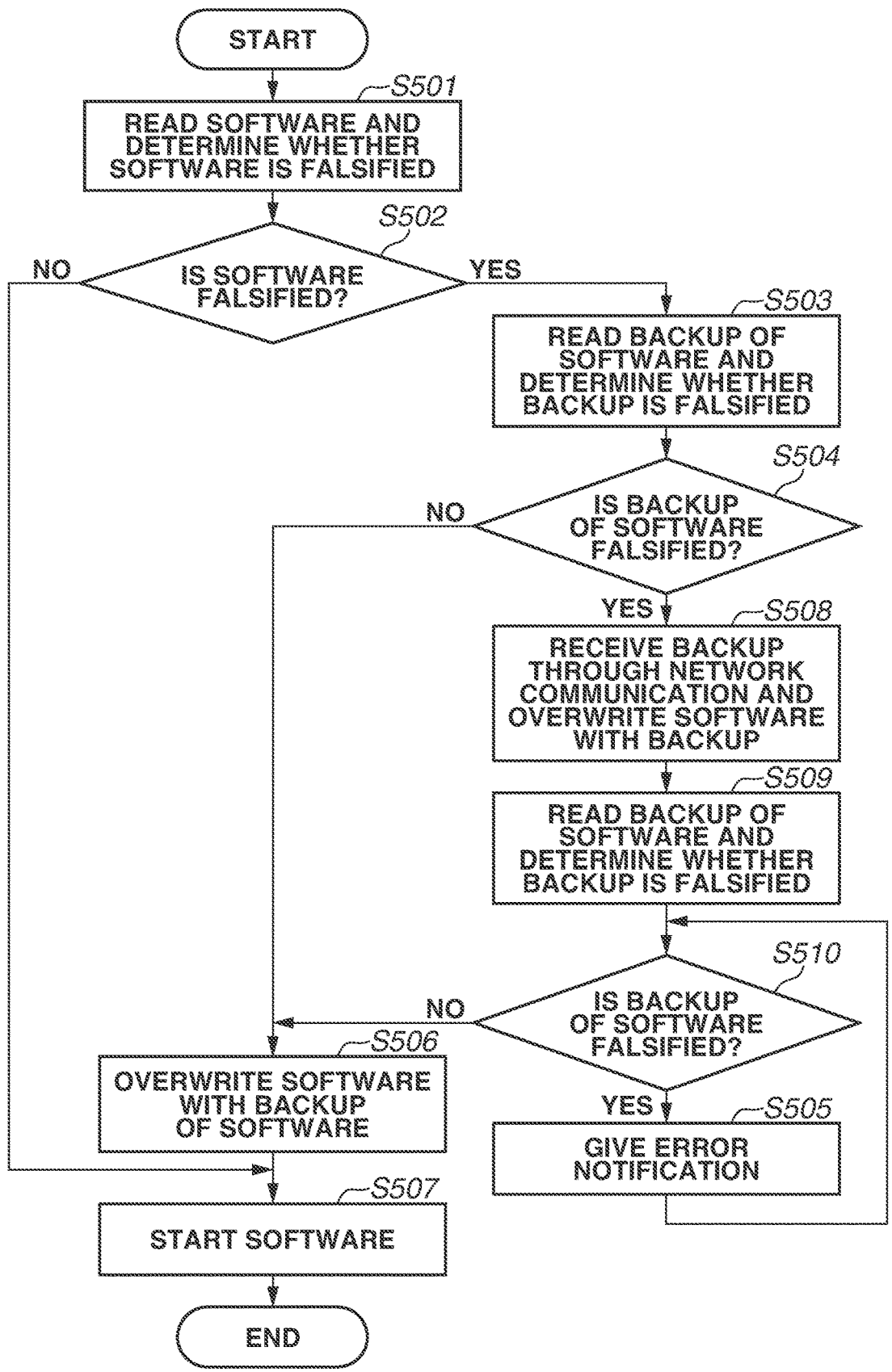

INFORMATION PROCESSING APPARATUS

BACKGROUND

Field

The present disclosure relates to an information processing apparatus and a control method for controlling an information processing apparatus.

Description of the Related Art

In recent years, image forming apparatuses have included a falsification detection function for, when a program is started, performing a signature verification process on the program to be started, thereby determining whether the program is valid, and preventing a falsified program from starting. There have also been image forming apparatuses including a recovery function for, if falsification is detected at this time, overwriting the falsified program with a program as a backup, thereby restoring the falsified program.

Japanese Patent Application Laid-Open No. 2020-95470 discusses a technique for overwriting a target program with a backup program and then performing a falsification detection process on the overwritten target program again, thereby detecting a writing failure in an area or a device as the overwriting destination.

SUMMARY

According to an aspects of the present disclosure, an information processing apparatus includes a storage unit configured to store at least one program and at least one processor configured to read the at least one program from the storage unit and verify validity of the read at least one program, wherein the processor is further configured to execute the at least one program based on a determination that the at least one program is valid, the processor is configured to verify validity of a backup corresponding to the at least one program based on a determination that the at least one program is invalid, and the processor is configured to overwrite the at least one program that is stored in the storage unit with the backup corresponding to the at least one program based on a determination that the at least one program is invalid and the backup corresponding to the at least one program is valid.

Further features will become apparent from the following description of exemplary embodiments with reference to the attached drawings.

BRIEF DESCRIPTION OF THE DRAWINGS

FIG. 4 is a flowchart illustrating determination of falsification of each program and an overwriting process using a backup.

FIG. 5 is another flowchart illustrating determination of falsification of each program and an overwriting process using a backup.

DESCRIPTION OF THE EMBODIMENTS

Exemplary embodiments of the present disclosure will be described in detail with reference to the attached drawings. The following exemplary embodiments are not seen to be limiting, and not all combinations of the features described in the exemplary embodiments are essential for carrying out the present exemplary embodiments. The present exemplary embodiments are described using an image processing apparatus as an example of an information processing apparatus, but are not limited to this.

Figure 1:
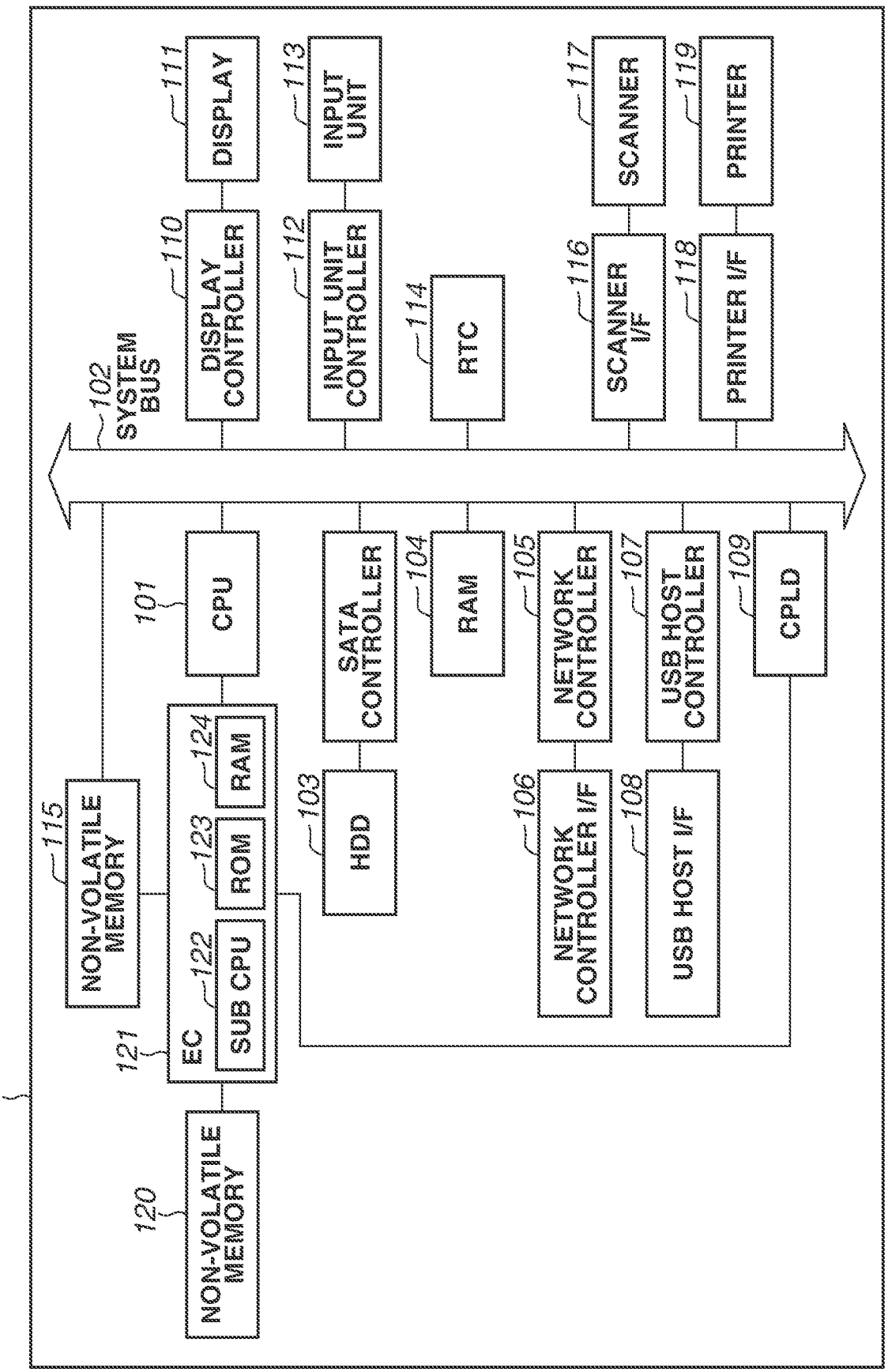
FIG. 1 is a block diagram illustrating a hardware configuration of an image forming apparatus.

FIG. 1 is a hardware configuration diagram of an image forming apparatus 1. A central processing unit (hereinafter, "CPU") 101 causes a program for activating the image forming apparatus 1 to operate. A system bus 102 is a path through which the CPU 101 accesses other units of the image forming apparatus 1 and how the other units access each other.

A hard disk unit (hereinafter, "hard disk drive (HDD)") 103 stores programs(s) for the image forming apparatus 1, various programs necessary for the operation of the image forming apparatus 1, a database, image data generated by a scanner 117, and image data for use in printing by a printer 119. A Serial AT Attachment (SATA) controller controls reading from and writing to the HDD 103. While an HDD is used as an example in the present embodiment, in another exemplary embodiment, a non-volatile semiconductor storage device such as a solid-state drive (SSD) can be used.

A random-access memory (hereinafter, "RAM") 104 is a storage area into which a program for the image forming apparatus 1 is loaded, and which stores a variable when the program operates and data transferred from each of the units of the image forming apparatus 1 by direct memory access (hereinafter, "DMA").

A network controller 105 and a network controller interface (I/F) 106 perform communication between the image forming apparatus 1 and other devices on a network. A Universal Serial Bus (USB) host controller 107 and a USB host I/F 108 control communication between the image forming apparatus 1 and a USB device. The USB host I/F 108 is connected to the USB device using a USB cable.

Depending on the type of USB device being connected, the USB host I/F 108 can be directly connected to the USB device without using the USB cable.

A display 111 displays the operating state of the image forming apparatus 1 so that a user can confirm the operating state of the image forming apparatus 1. A display controller 110 controls display on the display 111.

An input unit 113 receives an instruction from a user to the image forming apparatus 1. An input unit controller 112 controls the input unit 113. More specifically, the input unit 113 is an input system such as a keyboard, a mouse, a numeric keypad, a cursor key, a touch panel, or an operation unit keyboard. In a case where the input unit 113 is a touch panel, the input unit 113 is typically physically attached to the surface of the display 111.

A real-time clock (hereinafter, "RTC") 114 has a clock function, an alarm function, and a timer function of the image forming apparatus 1. A non-volatile memory 115 is a rewritable memory. The non-volatile memory 115 stores a program such as Basic Input/Output System (BIOS), and does not store at least image data generated by the scanner 117 and image data for use in printing by the printer 119.

A non-volatile memory 120 stores a program such as BIOS as a backup of the non-volatile memory 115.

A complex programmable logic device (CPLD) 109 is a unit that reads the low/high state of a signal line on a substrate circuit via the CPU 101 or enables the CPU 101 to change the setting of the low/high state. The CPLD 109 is a programmable logic device enables control of the turning off and on of power on the image forming apparatus 1. Within the CPLD 109, a general-purpose input/output (hereinafter, "GPIO") exists. The CPU 101 changes the setting value of a register of the GPIO, thereby enabling turning off and on of power.

The scanner 117 is connected to the image forming apparatus 1 via the system bus 102 and a scanner I/F 116. The printer 119 is connected to the image forming apparatus 1 via the system bus 102 and a printer I/F 118.

An embedded controller (EC) 121 including a sub CPU 122, a sub ROM 123, and a sub RAM 124 verifies the validity of the BIOS program in the non-volatile memory 115. When a current is applied to the EC 121, the sub CPU 122 executes a program in the sub ROM 123. By this process, the sub CPU 122 reads embedded controller firmware (ECFW) in the non-volatile memory 115 and loads the ECFW into the sub RAM 124. Using the program loaded into the sub RAM 124, the sub CPU 122 verifies whether the non-volatile memory 115 is falsified. The EC 121 is also connected to the non-volatile memory 120 used for backup. If the EC 121 determines that the non-volatile memory 115 is in an invalid state, the EC 121 verifies whether the content of the non-volatile memory 120 (e.g., the BIOS) is falsified. If the content of the non-volatile memory 120 is not falsified, the EC 121 overwrites the non-volatile memory 115 with the copied content of the non-volatile memory 120. At this time, the EC 121 can overwrite the non-volatile memory 115 with all the copied contents of the non-volatile memory 120.

Figure 2:
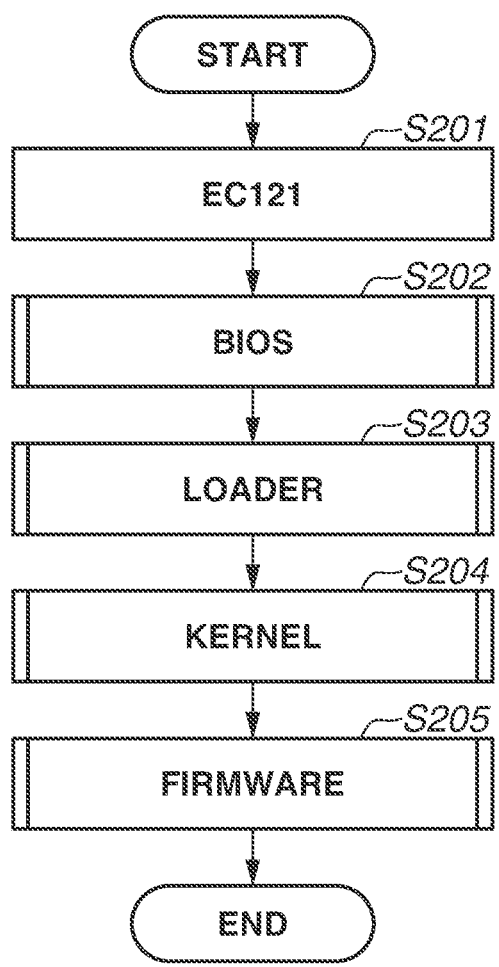
FIG. 2 is a flowchart illustrating a process for starting the image forming apparatus.

FIG. 2 is a flowchart illustrating at process for starting the image forming apparatus 1. This process illustrated in the flowchart is achieved by a power switch of the image forming apparatus 1 being turned on, which causes the sub CPU 122 to execute the program stored in the sub ROM 123, load the ECFW into the sub RAM 124, and execute the process illustrated in the flowchart using the loaded program.

In step S201, reset of the EC 121 is cancelled, and the EC 121 reads programs for the EC 121 recorded in the non-volatile memory 115 and starts operating. In step S202, the EC 121 determines whether the BIOS recorded in the non-volatile memory 115 is falsified. If it is determined there is no falsification, the EC 121 cancels resetting of the CPU 101 and causes the CPU 101 to start a BIOS process. The CPU 101 then executes the BIOS process. The CPU 101 determines whether programs saved in the HDD 103 are falsified, and also performs an initialization process for initializing each hardware unit. The details of the falsification determination process for the programs will be described with reference to FIG. 4.

In step S203, if a loader is not falsified, the CPU 101 starts a loader process. In step S204, the CPU 101 determines whether a kernel is falsified. If the kernel is not falsified, the CPU 101 starts a kernel process. In step S205, the CPU 101 determines whether any firmware elements are falsified. If no firmware elements were falsified, the CPU 101 sequentially starts firmware element(s).

Figure 3:
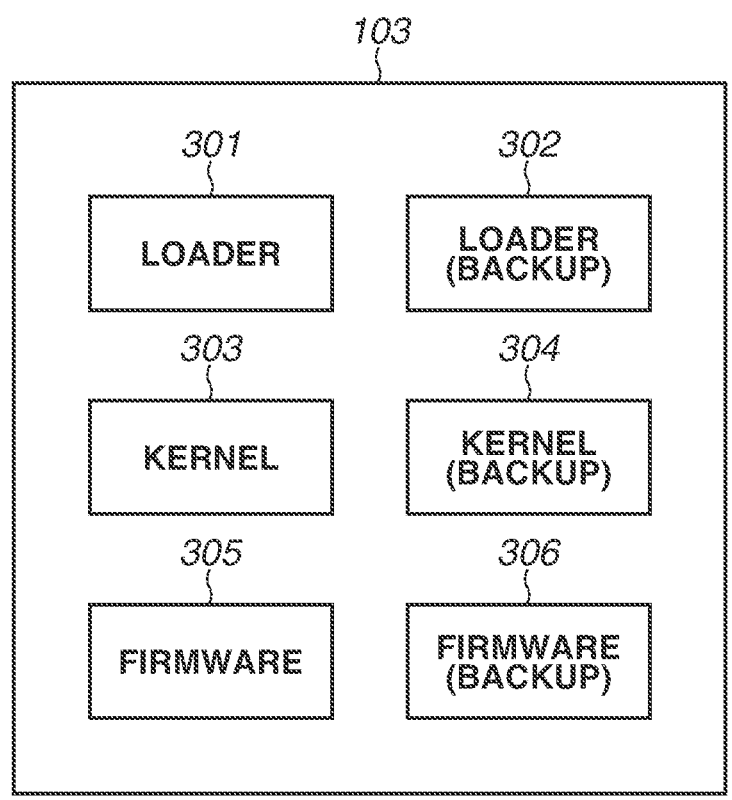
FIG. 3 is a block diagram illustrating programs saved in a hard disk drive (HDD).

FIG. 3 illustrates programs included in the HDD 103. These include, but are not limited to, a loader 301, a kernel 303, and firmware 305. Also included are backups of the respective programs loader (backup) 302, kernel (backup) 304, and firmware (backup) 306.

FIG. 4 illustrates a flowchart for the falsification determination process and a restoration overwriting process that are performed when the programs illustrated in FIG. 3 are started. As illustrated in FIG. 4, the process associated with this flowchart is for both the programs and the respective program backups in FIG. 3.

For example, if the program is the load 301, backup of the program is loader (backup 302). If the program is the kernel 303, the backup of the program is the kernel (backup) 304. If the program is the firmware 305, the backup of the program is the firmware (backup) 306.

Each program is verified by the program in the previous step described in in FIG. 2. For example, a program that verifies the loader 301 is the BIOS (step S202), which is in step previous to the step (S203) of the loader 301. While the following description will refer to this for discussion purposes, the loader 301 verifies and overwrites the kernel 303, and the kernel 303 verifies and overwrites the firmware 305, as illustrated in FIG. 2. The CPU 101 can determine falsification using other programs read from the HDD 103.

While the detection of falsification of the loader 301 is described as an example, similarly, the detection of falsification of the kernel 303 and the firmware 305 is performed using a verification program corresponding to the kernel 303 and the firmware 305.

Turning to FIG. 4, in step S401, the BIOS reads the loader 301 from the HDD 103 and verifies whether the loader 301 is falsified. In the present embodiment, verification whether the loader 301 is falsified consists of a signature verification process using a public key, where the public key is compared with a correct value stored in advance.

If the BIOS determines that the loader 301 is falsified (Yes in step S402), then in step S403, the BIOS reads the loader (backup) 302 from the HDD 103 and verifies whether the loader (backup) 302 is falsified. If the BIOS determines that the loader (backup) 302 is also falsified (Yes in step S404), then in step S405, the BIOS provides an error notification and the process us stopped. The process for providing an error notification is, for example, an operation for displaying error information on the display 111, providing an audible error indication, etc.

If the loader (backup) 302 is not falsified (No in step S404), then in step S406, the BIOS causes the HDD 103 to execute an overwriting process for overwriting the falsified loader 301 with the verified loader (backup) 302. This results in a state where the loader 301 is not considered falsified. After the HDD 103 overwrites the loader 301 with the loader (backup) 302, or if the BIOS determines in step S402 that the loader 301 is not falsified (No in step S402), the loader 301 can be executed. Thus, the BIOS starts the loader 301 and starts a process on the loader 301.

In FIG. 4, the detection of falsification of the backup of the program in step S404 is performed after the detection of falsification of the program in step S402. In another exemplary embodiment, the detection of falsification of the backup of the program in step S404 can be performed before or in parallel with the detection of falsification of the program in step S402.

FIG. 5 illustrates a flowchart for, in addition to the process described in FIG. 4, the process of acquiring a backup file through network communication and using the acquired backup file before providing an error notification in step S405. The process of FIG. 5 is the same as that of FIG. 4, with the only difference being steps S508, S509, and S510. Thus, detailed descriptions of steps S502, S503, S505, S506, and S507 are omitted herein unless needed for the description of steps S508, S509, or S510.

If the loader (backup) 302 is falsified (Yes in step S504), then in step S508, the BIOS controls the network controller 105 to receive a loader (not illustrated) from an external network. The communication destination can be a pre-set server, a user defined server, etc.

In step S509, the BIOS verifies whether the loader (not illustrated) acquired in step S508 is falsified. This verification method is similar to those in steps S501 and S503, which is the same as those in steps S401 and S403 of FIG. 4. As a result of step S509, if the BIOS determines that the loader (not illustrated) is falsified (Yes in step S510), then in step S505, the BIOS performs a process similar to that of step S405, i.e., providing an error notification and stopping the operation. If, the BIOS determines that the loader (not illustrated) is not falsified (No in step S510), then in step S506, the HDD 103 performs a process similar to that of step S406 in FIG. 4, by overwriting the loader 301 with the loader (not illustrated). This results in a state where the loader 301 is not considered falsified.

In FIG. 5, after steps S503 and S504 are executed, steps S508 to S510 are executed. In another exemplary embodiment, the execution order can be reversed. In yet another exemplary embodiment, a configuration can be implemented where steps S508 to S510 are performed, and steps S503 and S504 are not performed.

In another exemplary embodiment, the detection of falsification of the backup of the program in steps S504 and S510 can be performed after, before, or in parallel with the detection of falsification of the program in step S502.

As previously discussed, the processes of FIG. 4, and in turn the process of FIG. 5 are not limited to the loader 301. For example, both processes are also applicable to the BIOS. In the case of the BIOS, in steps S402 and S502, falsification is detected in the BIOS read from the non-volatile memory 115. In steps S404 and S504, falsification is detected in a BIOS backup read from the non-volatile memory 120. In steps S406 and S506, the data stored in the non-volatile memory 120 is read, and the non-volatile memory 115 is overwritten with the read data.

While various examples and exemplary embodiments have been described, the spirit and scope of the present disclosure are not limited to a particular description in the specification.

OTHER EMBODIMENTS

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While exemplary embodiments have been described, it is to be understood that these embodiments are not seen to be limiting. The scope of the following claims is to be accorded the broadest interpretation so as to encompass all such modifications and equivalent structures and functions.

This application claims the benefit of Japanese Patent Application No. 2021-024692, filed Feb. 18, 2021, which is hereby incorporated by reference herein in its entirety.

What is claimed is:

1. An information processing apparatus comprising:
   a memory configured to store a first program;
   a storage unit configured to store a second program and a third program;
   a first processor configured to verify whether the first program is valid; and
   a second processor configured to execute the first program in a case where the first program is valid,
   wherein the second processor verifies whether the second program is valid,
   wherein the second processor executes the second program in a case where the second program is valid, and the second processor verifies whether the third program is valid in a case where the second program is invalid, and
   wherein the second processor overwrites the second program with the third program in a case where the third program is valid.

2. The information processing apparatus according to claim 1, wherein the second processor is further configured to provide notification of an error condition based on a determination that a backup of the third program is invalid.

3. The information processing apparatus according to claim 1, further comprising a communication unit configured to communicate with an external apparatus,
   wherein the information processing apparatus receives, via the communication unit, a fourth program based on a determination that the third program is invalid,
   wherein the second processor verifies validity of the received fourth program, and
   wherein the second processor overwrites the second program stored in the storage unit determined to be invalid with the fourth program determined to be invalid.

4. The information processing apparatus according to claim 3, wherein the second processor is further configured to provide notification of an error condition based on a determination that the fourth program is invalid.

5. The information processing apparatus according to claim 1, wherein the second processor executes the second program that was overwritten.

6. The information processing apparatus according to claim 1,
   wherein the storage unit is a non-volatile storage device that stores at least image data, and
   wherein the second program and the third program stored in the storage unit are a loader.

7. The information processing apparatus according to claim 1, wherein the second processor causes the storage unit to overwrite the second program stored in the storage unit with all of the third program in a case where the third program is valid.

8. The information processing apparatus according to claim 1,
   wherein the memory is a non-volatile memory that does not store image data, and wherein the first program is a Basic Input/Output System (BIOS).

9. The information processing apparatus according to claim 1, wherein the storage unit stores a fifth program, a sixth program, a seventh program, and an eighth program, the fifth program is a kernel, the sixth program is a backup of the kernel, the seventh program is firmware, and the eighth program is a backup of the firmware.

10. A method for controlling an information processing apparatus including a memory configured to store a first program and a storage unit configured to store a second program and a third program, the method comprising:

performing, by a first processor, a first verification process of reading the first program from the storage unit and verifying validity of the first program;

executing, by a second processor, the first program based on a determination the first program is valid;

performing, by the second processor, a second verification process of verifying validity of a second program;

executing, by the second processor, the second program in a case where the second program is valid;

performing, by the second processor, a third verification process of verifying validity of the third program in a case where the second program is invalid; and overwriting the second program with the third program in a case where the third program is valid.

* * * * *